United States Patent [19]

Ahlert et al.

[11] Patent Number: 5,051,288
[45] Date of Patent: Sep. 24, 1991

[54] THIN FILM MAGNETIC RECORDING DISK COMPRISING ALTERNATING LAYERS OF A CoNi OR CoPt ALLOY AND A NON-MAGNETIC SPACER LAYER

[75] Inventors: Richard H. Ahlert, San Jose; James K. Howard, Morgan Hill; Steven E. Lambert, San Jose; Ian L. Sanders, Morgan Hill, all of Calif.

[73] Assignee: International Business Machines Corporation, Armonk, N.Y.

[21] Appl. No.: 324,374

[22] Filed: Mar. 16, 1989

[51] Int. Cl.$^5$ .............................................. G11B 23/00
[52] U.S. Cl. ..................................... 428/64; 428/694; 428/900; 428/926; 428/928
[58] Field of Search ............... 428/655, 656, 660, 662, 428/663, 666, 667, 694, 900, 926, 928

[56] References Cited

U.S. PATENT DOCUMENTS

| | | | |
|---|---|---|---|
| 3,350,180 | 10/1967 | Croll | 29/183.5 |
| 3,479,156 | 11/1969 | Ginder | 29/183.5 |
| 3,516,076 | 6/1970 | Stein | 340/174 |
| 3,787,237 | 9/1974 | Grunberg | 117/239 |
| 4,596,646 | 6/1986 | Kitada | 204/192 X |
| 4,610,935 | 9/1986 | Kumasaka | 428/632 |
| 4,652,499 | 3/1987 | Howard | 428/641 |

FOREIGN PATENT DOCUMENTS 59-157837 9/1984 Japan.
61-172218 8/1985 Japan.
60-186804 9/1985 Japan.

OTHER PUBLICATIONS

W. T. Maloney, "Sputtered Multilayer Films For Digital Magnetic Recording" IEEE Transactions on Magnetics, vol. Mag.-15, No. 3, Jul. 1979, pp. 1135-1137.

S. Katayama, et al., "Magnetic Properties and Read-Write Characteristics of Multilayer Films on a Glass Substrate", IEEE Transactions on Magnetics, vol. 24, No. 6, Nov. 1988, pp. 2982-2984.

Primary Examiner—Merrell C. Cashion, Jr.
Assistant Examiner—Stevan A. Resan
Attorney, Agent, or Firm—Thomas R. Berthold

[57] ABSTRACT

An improved CoPt based or CoNi based alloy magnetic recording disk for horizontal recording has a magnetic recording layer which is a laminated structure of relatively thin magnetic alloy films separated by relatively thin non-magnetic spacer films. The resulting laminated disk structure has substantially decreased intrinsic media noise at high linear recording densities.

8 Claims, 3 Drawing Sheets

THIN FILM MAGNETIC RECORDING DISK COMPRISING ALTERNATING LAYERS OF A CoNi OR CoPt ALLOY AND A NON-MAGNETIC SPACER LAYER

BACKGROUND OF THE INVENTION

1. Technical Field

This invention relates to thin film metal alloy magnetic recording disks for horizontal recording, and in particular to a CoPt alloy or CoNi alloy disk having low intrinsic media noise at high linear recording density.

2. Description of the Prior Art

One of the problems with thin film metal alloy media, including CoPt alloy and CoNi alloy media, is that the intrinsic media noise increases with increasing linear recording density. Media noise arises from irregularities in the magnetic transitions and results in random shifts of the readback signal peaks. These random shifts are referred to as "peak jitter" or "time jitter". Thus, the higher the media noise, the higher the bit error rate. It is therefore desirable to develop a thin film metal alloy media which generates noise below a maximum acceptable level in order that data can be recorded at maximum linear density. The effect of intrinsic media noise, as measured by peak jitter and media signal-to-noise ratio (SNR), on the bit error rate in magnetic recording systems is described by Katz, et al., in "Effect of Bitshift Distribution on Error Rate in Magnetic Recording", IEEE Trans. on Magnetics, Vol. MAG-15, pp. 1050–1053, 1979. The measurement of media SNR is described by Belk, et al., in "Measurement of the Intrinsic Signal-to-Noise Ratio for High Performance Rigid Recording Media", J. Appl. Physics, 59(2), Jan. 15, 1986, pp. 557-562.

Assignee's U.S. Pat. No. 4,789,598 describes a CoPtCr metal alloy magnetic recording disk wherein the high Cr concentration reduces the intrinsic media noise at high recording density.

SUMMARY OF THE INVENTION

The invention is an improved CoPt based or CoNi based alloy magnetic recording disk for horizontal recording wherein the magnetic recording layer in the disk structure is a laminated structure of relatively thin CoPt or CoNi alloy magnetic films separated by relatively thin non-magnetic spacer films.

The resulting laminated disk structure has substantially decreased intrinsic media noise at high linear recording densities. The benefits of improved signal-to-noise ratio (SNR) are best achieved when the non-magnetic spacer film is maintained as thin as possible, i.e. a thickness just sufficient to effectively interrupt the continuous nature of the subsequently deposited magnetic film.

For a fuller understanding of the nature and advantages of the present invention reference should be made to the following detailed description taken in conjunction with the accompanying drawings.

DESCRIPTION OF THE PREFERRED EMBODIMENTS

In order to illustrate the improved SNR for CoPt alloy laminated disks, and the dependence of that improvement on the number and thickness of the films, various types of CoPt alloy disks were fabricated with various types of non-magnetic spacer films.

The disks were prepared in an RF-DC magnetron sputtering system (S-gun). The Ar sputtering pressure was approximately $1 \times 10^{-7}$ Torr before deposition and was maintained at 3.2 m Torr for each deposition. All depositions were conducted without substrate heat. The substrates were 5¼" AlMg/NiP disks. The surfaces of the substrates were RF discharge cleaned and the Mo, Cr, or CrV underlayers (300–400 Angstroms thick) were sputter deposited on the substrates before lamination of the magnetic layer. The magnetic layer was then sputter deposited by alternating the sputtering sources (magnetic film and spacer) to form the laminated structure.

Table 1 depicts the magnetic properties of a single film (550 Angstroms) $Co_{74}Pt_9Cr_{17}$ layer compared to a two-film ($2 \times 250$ Angstroms) layer separated by a 80 Angstroms thick film of non-magnetic $Cr_{80}V_{20}$.

TABLE 1

|  | Single Layer (550 Angstroms) | Laminated Film (2 × 250 Angstroms) |
| --- | --- | --- |
| $M_r\delta$ | $2.20 \times 10^{-3}$ | $2.15 \times 10^{-3}$ |
| $H_c$ | 1275 Oe | 1315 Oe |
| S | 0.91 | 0.91 |
| S* | 0.90 | 0.83 |

Figure 1:
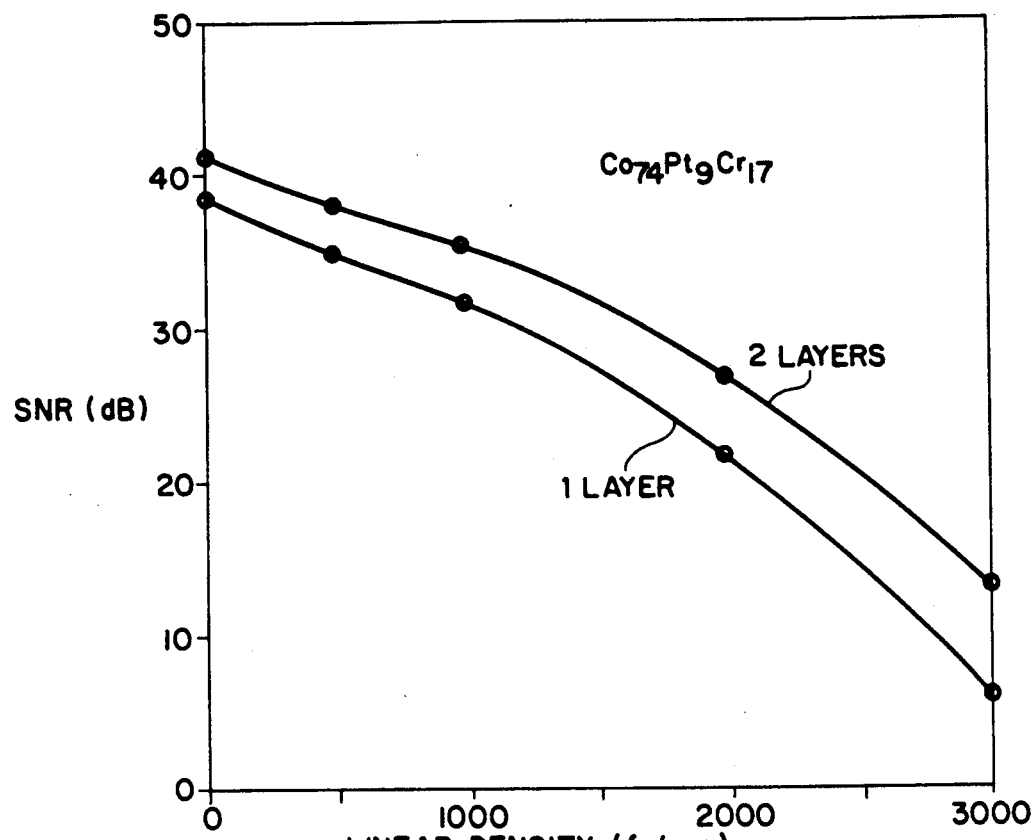
FIG. 1 is a graph of SNR versus linear density for a single layer and a two-layer CoPtCr disk structure.

FIG. 1 is a plot of the SNR (dB) versus linear recording density for the two disks whose data is given in Table 1, where SNR is the ratio of base-to-peak signal amplitude (in microvolts) to RMS media noise (in microvolts). Note that a two-film structure of CoPtCr increases the SNR by about 8–9 dB at 3,000 flux reversals per millimeter (fr/mm). The 80 Angstroms $Cr_{80}V_{20}$ layer which separated the two CoPtCr films had no effect on the isolated readback pulses, thus indicating that the lamination did not adversely affect the recording properties.

Figure 2:
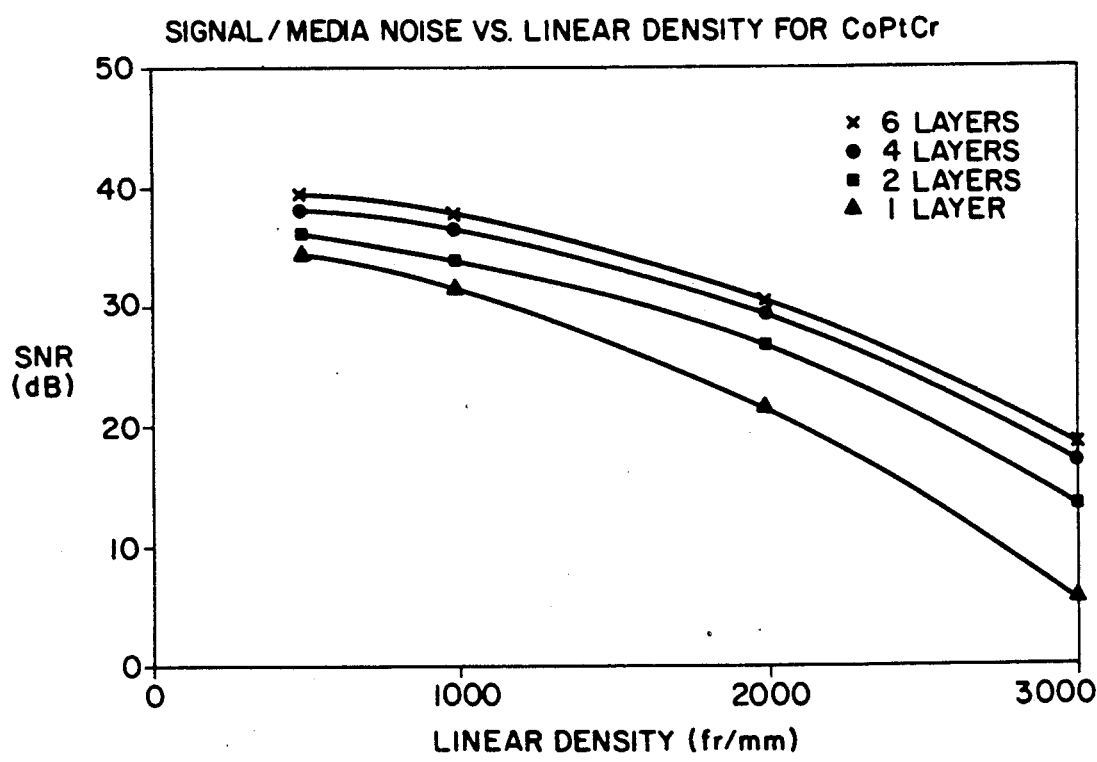
FIG. 2 is a plot of SNR as a function of linear density for different laminated CoPtCr disk structures which illustrate the reduction in noise as the number of films increases.

FIG. 2 depicts the effect of laminating CoPtCr with up to 6 films ($6 \times 90$ Angstroms) where adjacent films are separated by $Cr_{80}V_{20}$ non-magnetic spacer films (40 Angstroms). A single film structure yielded only about a 5 dB SNR at 3,000 fr/mm, compared to approximately a 20 dB SNR for the 6-film laminated structure.

Figure 3:
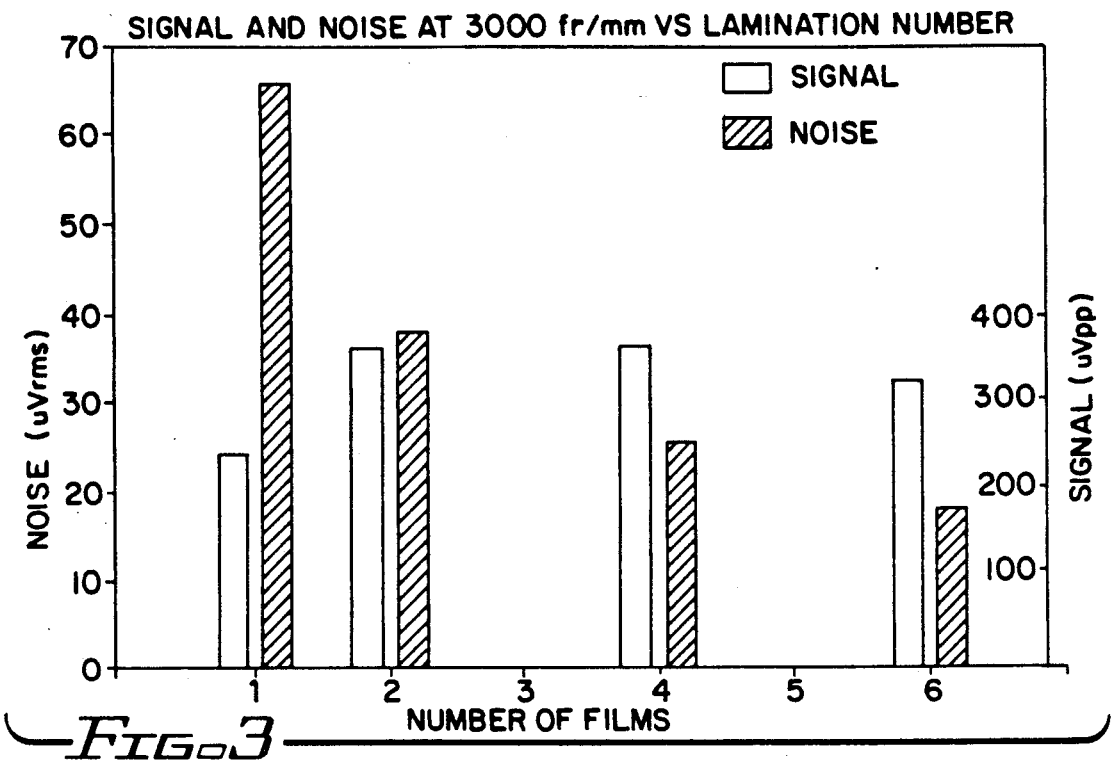
FIG. 3 is a bar chart illustrating the measurements of signal and noise as a function of the number of films in the laminated disk structure.

An overall comparison of the effect of lamination on signal and noise is shown in FIG. 3. As is apparent, the effect of lamination on signal is minimal but the reduction in noise is dramatic as the number of films in the lamination increases.

Figure 4:
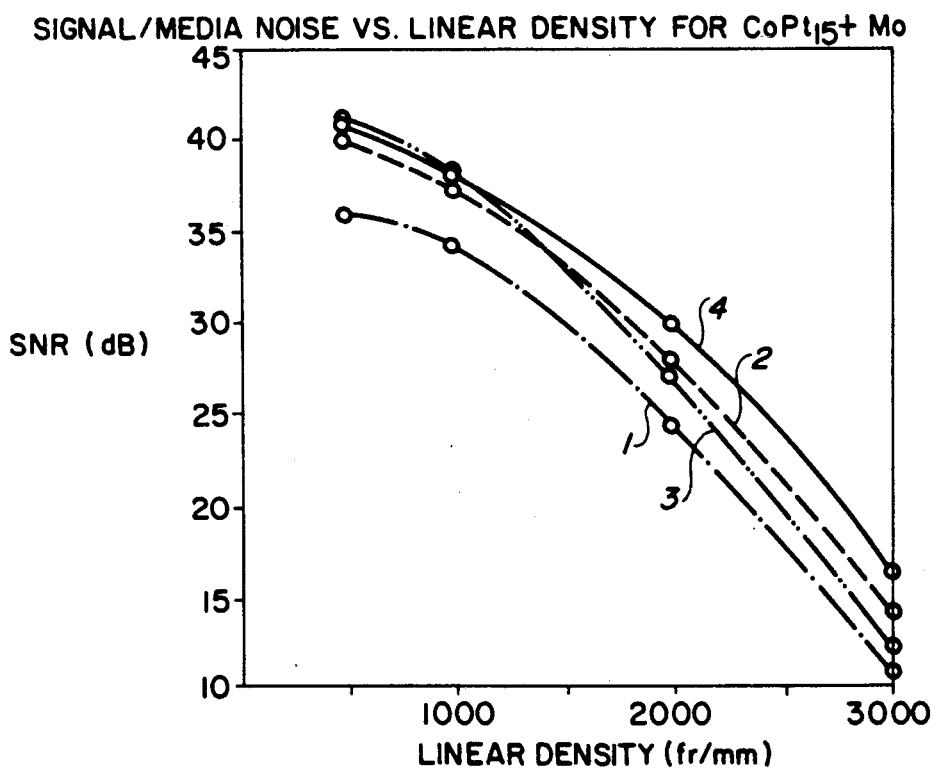
FIG. 4 is a plot of SNR as a function of linear density for a CoPtMo disk illustrating the reduction in media noise with increasing number of films.

FIG. 4 depicts SNR data for a $Co_{68}Pt_{12}Mo_{20}$ disk, laminated with either 80 Angstroms or 40 Angstroms of non-magnetic Mo, as a function of linear density. Note that lamination improves the SNR at 3,000 fr/mm in a manner similar to that for CoPtCr for one and two-film structures (FIG. 1). However, the 3-film structure (3×134 Angstroms) with 80 Angstroms Mo spacer films, was not as good as the 2-film structure. When the Mo spacer thickness was reduced from 80 Angstroms to 40 Angstroms, a SNR improvement was achieved. This indicates it is desirable to have the non-magnetic spacer films as thin as possible, i.e. the minimum thickness sufficient to permit the growth of a magnetic film.

Similar results of improved SNR were obtained for disks where the magnetic films of CoPtCr were also alloyed with Mo and separated by non-magnetic spacer films of Mo (40 Angstroms). Improved results in SNR were also observed for disks made according to the present invention when the spacer films were either Cr, Mo or CrV having thickness values between approximately 40 and 80 Angstroms.

Figure 5:
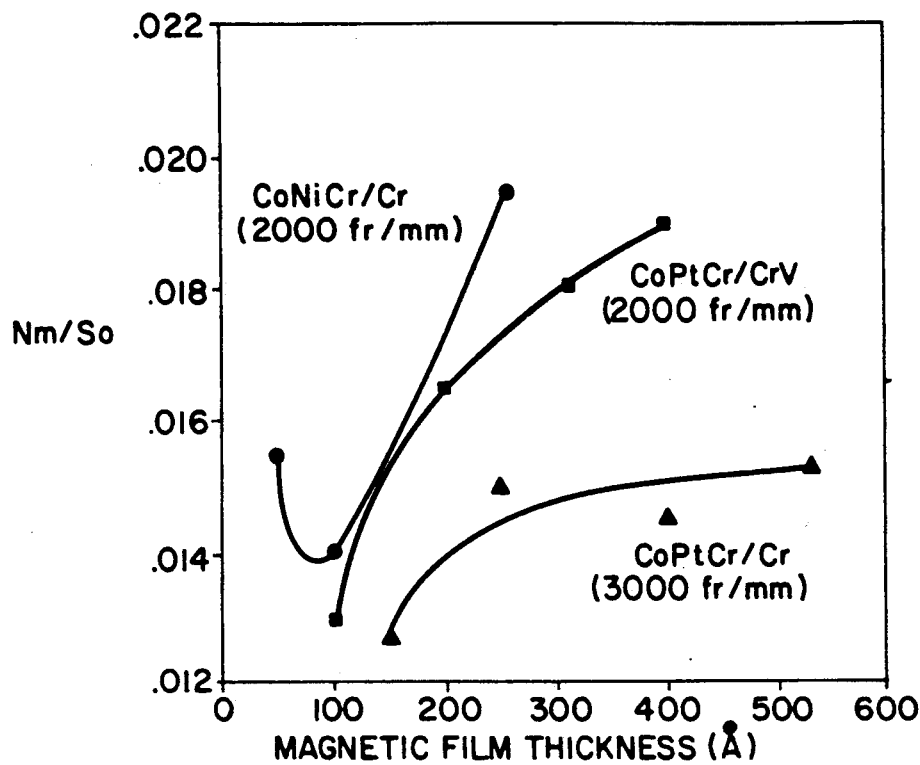
FIG. 5 is a plot of the ratio of media noise to signal amplitude as a function of magnetic film thickness.
Figure 6:
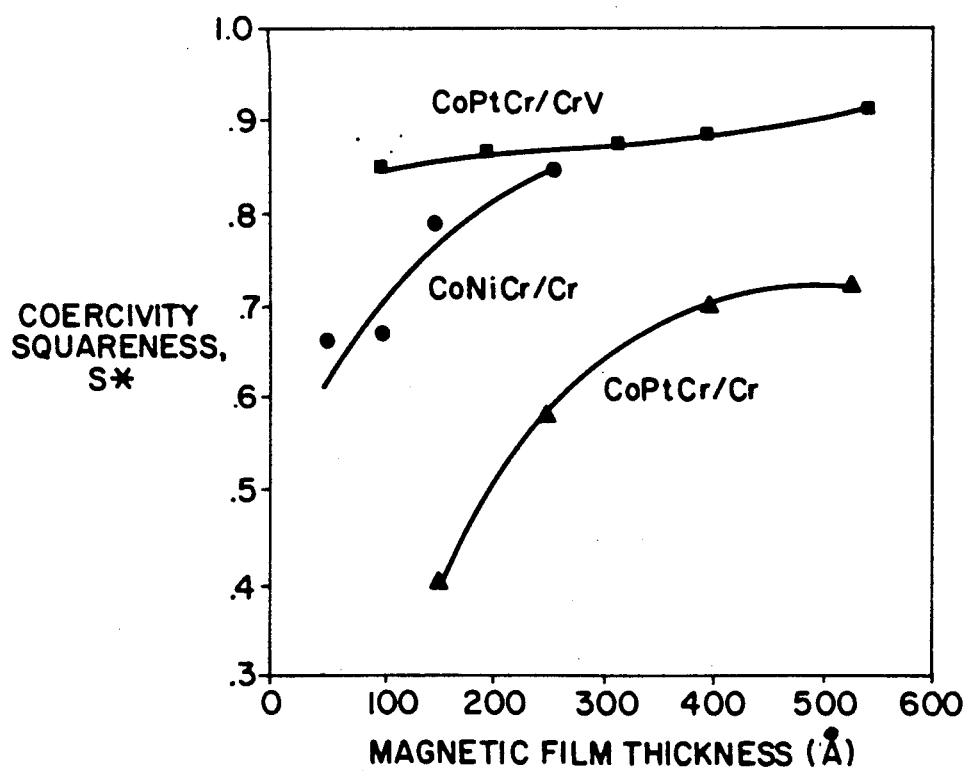
FIG. 6 is a plot of coercivity squareness as a function of magnetic film thickness.

The low-noise laminated thin film CoPt alloy disk made according to the present invention is based upon the discovery that a single thinner CoPt alloy film exhibits superior low-noise characteristics compared to a thicker film. (See FIG. 5, where $S_o$ is zero-to-peak signal amplitude of an isolated transition). It has also been experimentally determined that the improved SNR with a reduction in CoPt alloy film thickness is accompanied by a reduction in coercivity squareness, S* (See FIG. 6). It is believed that the low S* value is indicative of a lesser degree of exchange coupling between grains in the polycrystalline CoPt alloy film. Thus, in the present invention and contrary to conventional thin film CoPt alloy disks, it is desirable to have a lamination of multiple films, where each film has a relatively low value of S*, since this results in low intrinsic media noise. It is apparent, by reference to FIGS. 5 and 6, that this phenomena is also applicable to thin CoNi alloy films. Thus it is believed that the improved low noise media is also possible by lamination of thin CoNi alloy films with thin non-magnetic spacer films.

The above description relates only to the inventive structure which forms a part of the recording media, and not to the conventional well-known portions of the media and the media fabrication processes. For example, in the fabrication of thin film metal alloy disks, it is known to provide a protective overcoat, such as a sputtered carbon film, over the magnetic film. In the present invention the protective overcoat is formed over the uppermost film in the laminated film structure.

While the preferred embodiments of the present invention have been illustrated in detail, it should be apparent that modifications and adaptations to those embodiments may occur to one skilled in the art without departing from the scope of the present invention as set forth in the following claims.

What is claimed is:

1. A magnetic recording disk for horizontal recording comprising:
    a substrate; and
    a laminated magnetic layer formed over the substrate, the laminated magnetic layer further comprising alternating films of a magnetic film of a cobalt-based alloy having platinum or nickel present in the alloy and a non-magnetic spacer film, the laminated layer having at least two of said magnetic films and one of said spacer films.

2. A disk according to claim 1 further comprising a non-magnetic underlayer between the substrate and the laminated magnetic layer.

3. A disk according to claim 2 wherein the underlayer is formed of either chromium, molybdenum or an alloy comprising chromium and vanadium.

4. A disk according to claim 1 wherein the magnetic film alloy includes chromium or molybdenum.

5. A disk according to claim 1 wherein the non-magnetic spacer film is formed of chromium, molybdenum or an alloy comprising chromium and vanadium.

6. A disk according to claim 1 wherein each of the spacer films has a thickness less than approximately 80 Angstroms.

7. A disk according to claim 1 wherein the laminated magnetic layer has a coercivity squareness S* in the range of approximately 0.6 to 0.8.

8. A magnetic recording disk for horizontal recording comprising:
    a substrate; and
    a first magnetic film of an alloy comprising cobalt, chromium and platinum having a thickness less than approximately 250 Angstroms formed over the substrate;
    a first non-magnetic film of chromium or an alloy comprising chromium and vanadium having a thickness less than approximately 80 Angstroms formed over said first magnetic film;
    a second magnetic film of an alloy comprising cobalt, chromium and platinum having a thickness of less than approximately 250 Angstroms formed over said first non-magnetic film; and
    a protective overcoat formed over said second magnetic film.

* * * * *